United States Patent
Lerch et al.

(10) Patent No.: US 10,972,911 B2
(45) Date of Patent: Apr. 6, 2021

(54) LOCATION-BASED CREDENTIAL SELECTION FOR WIRELESS TRANSACTIONS

(71) Applicant: Apple Inc., Cupertino, CA (US)

(72) Inventors: Matthias Lerch, Cupertino, CA (US); Florian Galdo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 15/718,242

(22) Filed: Sep. 28, 2017

(65) Prior Publication Data
US 2019/0098499 A1    Mar. 28, 2019

(51) Int. Cl.
*G06F 7/04* (2006.01)
*G06F 15/16* (2006.01)
(Continued)

(52) U.S. Cl.
CPC .............. *H04W 12/06* (2013.01); *G01S 5/14* (2013.01); *G06Q 20/20* (2013.01); *G06Q 20/227* (2013.01);
(Continued)

(58) Field of Classification Search
CPC ....... H04W 12/06; H04W 76/10; H04W 4/80; G01S 5/14; G06Q 20/20; G06Q 20/227;
(Continued)

(56) References Cited

U.S. PATENT DOCUMENTS 6,252,543 B1   6/2001 Camp
7,413,113 B1   8/2008 Zhu
(Continued)

FOREIGN PATENT DOCUMENTS

EP   3001373 A1   3/2016
JP   01-206279 A   8/1989
(Continued)

OTHER PUBLICATIONS

Extended European Search Report directed to related European Patent Application No. EP 18 18 9036, dated Nov. 11, 2018; 10 pages.
(Continued)

*Primary Examiner* — Darshan I Dhruv
(74) *Attorney, Agent, or Firm* — Sterne, Kessler, Goldstein & Fox P.L.L.C.

(57) ABSTRACT

The present disclosure includes an electronic device for selecting a credential based at least in part on location information. The electronic device can include a secure transaction subsystem and a processor. The secure transaction subsystem can be configured to store a plurality of credentials. The processor can be communicatively coupled to the secure transaction subsystem and configured to receive the location information from one or more radios. Further, the processor can be configured to determine that a distance between the electronic device and a terminal is less than a predetermined distance based on the location information. In response to determining the distance between the electronic device and the terminal is less than the predetermined distance, the processor can be configured to select the credential from the plurality of credentials based at least in part on the type of terminal.

20 Claims, 9 Drawing Sheets

(51) Int. Cl.
| | |
|---|---|
| *H04L 29/06* | (2006.01) |
| *H04W 12/06* | (2021.01) |
| *H04W 12/12* | (2021.01) |
| *H04W 76/10* | (2018.01) |
| *G06Q 20/38* | (2012.01) |
| *G06Q 20/22* | (2012.01) |
| *G06Q 20/32* | (2012.01) |
| *G06Q 20/20* | (2012.01) |
| *G01S 5/14* | (2006.01) |
| *H04W 4/80* | (2018.01) |

(52) U.S. Cl.
CPC ....... *G06Q 20/325* (2013.01); *G06Q 20/3224* (2013.01); *G06Q 20/3278* (2013.01); *G06Q 20/3821* (2013.01); *H04W 12/12* (2013.01); *H04W 76/10* (2018.02); *H04W 4/80* (2018.02)

(58) Field of Classification Search
CPC ............. G06Q 20/3224; G06Q 20/325; G06Q 20/3278; G06Q 20/3821
See application file for complete search history.

(56) References Cited

U.S. PATENT DOCUMENTS

| | | | | |
|---|---|---|---|---|
| 7,926,714 B1* | 4/2011 | Zhu | ...................... | G06Q 20/363 235/380 |
| 8,775,807 B1* | 7/2014 | Vazquez | ................. | G06F 21/31 713/168 |
| 8,909,247 B2 | 12/2014 | Tipton et al. | | |
| 9,224,141 B1 | 12/2015 | Lamba et al. | | |
| 9,429,992 B1* | 8/2016 | Ashenbrenner | ..... | G06F 13/4081 |
| 9,699,610 B1* | 7/2017 | Chicoine | ............ | G06Q 30/0201 |
| 9,810,767 B1* | 11/2017 | Hamilton | .............. | G01S 5/0242 |
| 2009/0037326 A1* | 2/2009 | Chitti | ................. | G06Q 20/3227 705/39 |
| 2009/0204817 A1* | 8/2009 | Deana-Roga | ....... | H04L 63/0464 713/171 |
| 2009/0231198 A1* | 9/2009 | Walsh | ..................... | A63B 71/06 342/463 |
| 2010/0082487 A1* | 4/2010 | Nelsen | ................... | G06Q 30/02 705/44 |
| 2011/0136429 A1* | 6/2011 | Ames | ....................... | H04B 5/02 455/41.1 |
| 2011/0137773 A1* | 6/2011 | Davis, III | ............... | G06Q 30/04 705/34 |
| 2011/0238476 A1* | 9/2011 | Carr | ....................... | H04W 4/21 705/14.25 |
| 2012/0094598 A1* | 4/2012 | Tysowski | ........... | G06Q 20/3224 455/41.1 |
| 2013/0046692 A1* | 2/2013 | Grigg | ................. | G06Q 20/4016 705/44 |
| 2013/0090991 A1* | 4/2013 | Underwood | ......... | G07B 15/063 705/13 |
| 2013/0282502 A1* | 10/2013 | Jooste | ................... | G06Q 20/363 705/21 |
| 2013/0346305 A1* | 12/2013 | Mendes | ............... | G06Q 20/351 705/41 |
| 2014/0058860 A1 | 2/2014 | Roh et al. | | |
| 2014/0204793 A1 | 7/2014 | Ben-Haim et al. | | |
| 2014/0301219 A1* | 10/2014 | Ben-Haim | ........... | G01S 13/876 370/252 |
| 2014/0379391 A1* | 12/2014 | Lulic | ...................... | G06Q 20/40 705/5 |
| 2015/0119077 A1 | 4/2015 | Buchheim et al. | | |
| 2015/0134428 A1* | 5/2015 | Li | ......................... | G07B 15/063 705/13 |
| 2015/0348007 A1* | 12/2015 | Khan | ................. | G06Q 20/4018 705/44 |
| 2016/0282448 A1* | 9/2016 | Sen | ........................... | G01S 5/14 |
| 2016/0381553 A1* | 12/2016 | Lee | ....................... | H04W 12/06 455/411 |
| 2017/0017958 A1* | 1/2017 | Scott | ................... | G06Q 20/3265 |
| 2017/0228717 A1* | 8/2017 | Rovik | .................. | G06Q 20/145 |
| 2018/0150829 A1* | 5/2018 | Kadam | ................... | G06Q 20/20 |
| 2018/0183489 A1* | 6/2018 | Rasmussen | .......... | H04B 1/7101 |
| 2018/0211188 A1* | 7/2018 | Bergdale | ............... | G07B 15/02 |
| 2018/0245559 A1* | 8/2018 | Kang | ....................... | F02N 11/0807 |
| 2018/0285592 A1* | 10/2018 | Sharifi | .................... | G06F 21/84 |
| 2018/0315038 A1* | 11/2018 | Rezayee | ............... | H04W 76/10 |
| 2019/0061689 A1* | 2/2019 | Breer | .................. | B60R 25/2081 |
| 2019/0087814 A1* | 3/2019 | Lassouaoui | ......... | H04L 63/0428 |

FOREIGN PATENT DOCUMENTS

| | | |
|---|---|---|
| JP | 2004-516463 A | 6/2004 |
| JP | 2005-179026 A | 7/2005 |
| JP | 2010-505299 A | 2/2010 |
| WO | WO-02/49379 A1 | 6/2002 |
| WO | WO-2008/036676 A2 | 3/2008 |

OTHER PUBLICATIONS

Notification of Reason(s) for Refusal, dated Aug. 26, 2019, for Japanese Patent Appl. No. 2018-152829, 5 pages including translation.

European Office Action issued in counterpart European Application No. 18189036.9, dated Sep. 22, 2020, 8 pages.

* cited by examiner

LOCATION-BASED CREDENTIAL SELECTION FOR WIRELESS TRANSACTIONS

FIELD

This disclosure generally relates to wireless communications, including location-based wireless transactions.

BACKGROUND

Electronic devices can include wireless capabilities to perform a variety of tasks such as wirelessly unlocking/locking a computer (or other device), wirelessly interacting with a television or other media device, and/or wirelessly conducting transactions. With respect to transactions, the wirelessly-enabled electronic device can store credentials corresponding to, for example, transit passes, identification, and credit/debit cards compatible with different payment types. For example, using a wireless communication protocol such as a near field communication (NFC) protocol, the electronic device can conduct a transaction with a nearby reader terminal using a stored credential that is compatible with the terminal.

SUMMARY

The present disclosure provides apparatus, method and computer program product embodiments for selecting an appropriate credential based at least in part on a location of the electronic device.

In some embodiments, an electronic device includes a secure transaction subsystem and a processor. The secure transaction subsystem is configured to store a plurality of credentials. The processor is coupled to the secure transaction subsystem and configured to receive a poll (or polling) message from one or more radios, transmit a response message in response to the poll message, and receive location information. Based at least in part on the location information, the processor is configured to determine that a distance between the electronic device and a terminal is less than a predetermined distance. In response to the distance being less than the predetermined distance, the processor is configured to select a credential from the plurality of credentials. Further, selection of the credential can be based at least in part on the type of terminal. In some embodiments, the electronic device can provide an indication (e.g., to a user of the device) about the selection of the credential and/or request confirmation.

In some embodiments, another electronic device includes a secure transaction subsystem and a processor. The secure transaction subsystem is configured to store a plurality of credentials. The processor is communicatively coupled (directly or indirectly) to the secure transaction subsystem and configured to receive location information from one or more radios. Based at least in part on the location information, the processor is configured to determine that a distance between the electronic device and a terminal is less than a predetermined distance. In response to determining that the distance is less than the predetermined distance, the processor is configured to select a credential from the plurality of credentials. The selection can further be based at least in part on a type of terminal. In some embodiments, the other electronic device can provide an indication (e.g., to a user of the other device) about the selection of the credential and/or request confirmation.

In some embodiments, a method for selecting a credential from a plurality of credentials stored on an electronic device is disclosed. The method can include receiving a poll message from a first wireless radio. In response to receiving the poll message, the method includes sending a response message to the first wireless radio. The method also includes: (i) receiving location information from a second wireless radio, where the location information is based at least in part on the poll and response messages; (ii) determining that a distance between the electronic device and a terminal is less than a predetermined distance based at least in part on the location information; and (iii) in response to determining that the distance is less than the predetermined distance, selecting a credential from the plurality of credentials. The method also includes detecting that communication has been established between the electronic device and the terminal via a short-distance wireless radio on the electronic device. Further, the method includes, in response to establishing a communication between the electronic device and the terminal, initiating a transaction with the terminal via the short-distance wireless radio.

BRIEF DESCRIPTION OF THE DRAWINGS/FIGURES

Embodiments of the present disclosure will now be described, by way of example only, with reference to the accompanying drawings in which corresponding reference symbols indicate corresponding parts. Further, the accompanying drawings, which are incorporated herein, form part of the specification and illustrate embodiments of the present disclosure.

Figure 1:
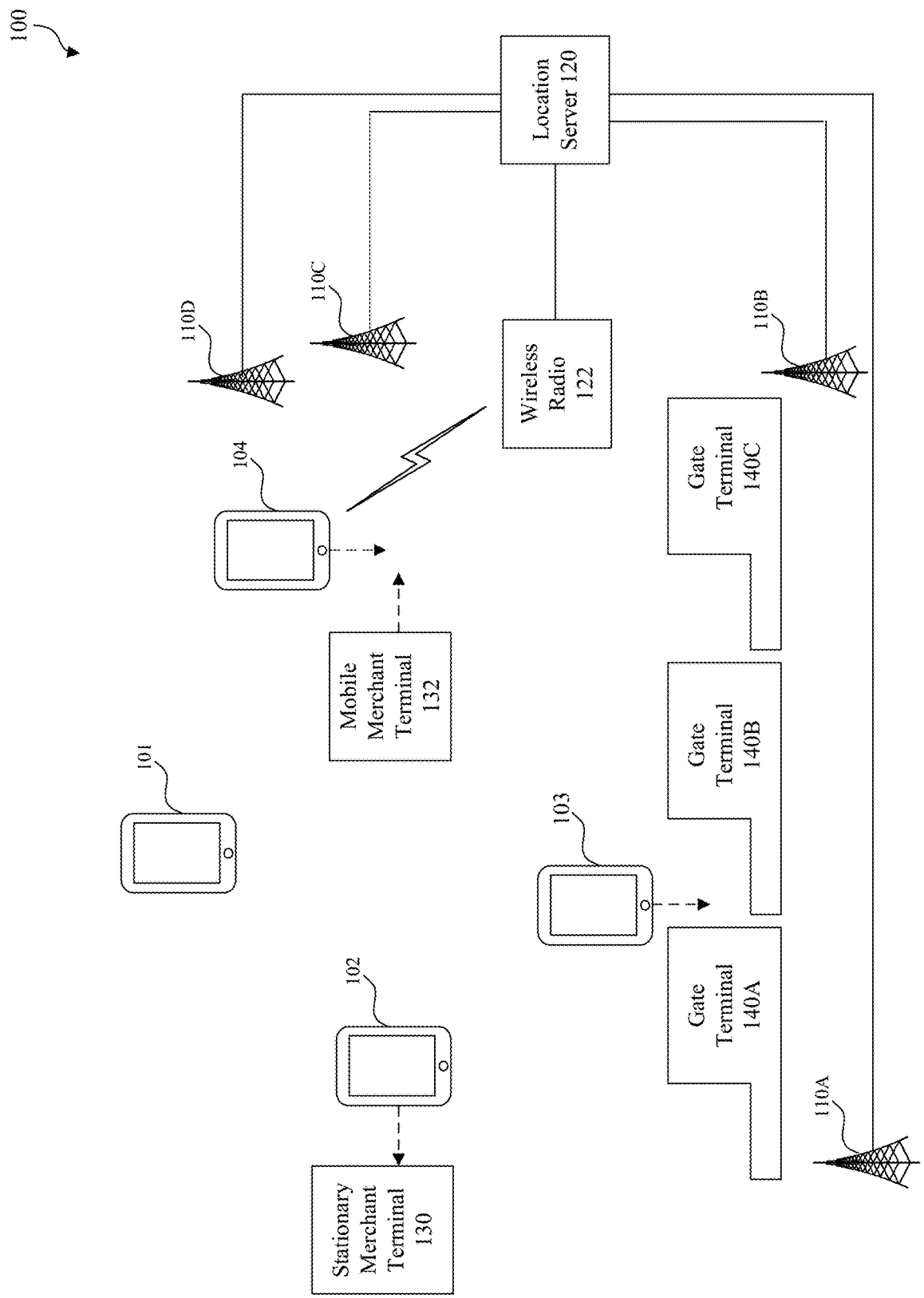
FIG. 1 illustrates an example environment for wirelessly performing transactions, according to some embodiments.

Features and advantages of embodiments of the present disclosure will become more apparent from the detailed description set forth below when taken in conjunction with the drawings. In the drawings, like reference numbers generally indicate identical, functionally similar, and/or structurally similar elements.

DETAILED DESCRIPTION

FIG. 1 illustrates an example environment 100 for wirelessly performing electronic transactions, according to some embodiments. For purposes of illustration, and not limitation, environment 100 is depicted as a transit station—e.g., train or subway station. Based on the description herein, other types of environments are applicable to the disclosed embodiments and are within the spirit and scope of the present disclosure.

FIG. 1 depicts electronic devices 101-104, a stationary merchant terminal 130, a mobile merchant terminal 132, transit gate terminals 140A-C, radios 110A-D, and a location server 120. In some embodiments, any or all of electronic devices 101-104 can be a mobile electronic device such as, for example, a smart phone, a tablet computer, a wearable device, a laptop computer, a human interface device, etc. Electronic devices 101-104 may be configured to communicate with other electronic devices using various wireless communication protocols, such as Wi-Fi, Bluetooth, radio-frequency identification (RFID), near field communications (NFC), 60 GHz communications, cellular communication, or any combination thereof. Any or all of electronic devices 101-104 may be equipped with a global positioning system (GPS) radio. In some embodiments, any or all of electronic devices 101-104 may also be equipped with an ultra-wide-band (UWB) radio configured to communicate with any or all of radios 110A-D.

Electronic devices 101-104 may perform wireless, electronic transactions using one or more credentials (or virtual credentials) associated with a respective electronic device, according to some embodiments. One or more of the credentials can be associated with an account, such as a transit account or a credit/debit account. One or more other credentials can be stored-value (or truth-on-card or actual cash value) credentials that retain an actual financial value on the card, such as a transit card or pre-paid card. Financial information such as, for example, credit card information and/or transit station card information may be stored on one or more of electronic devices 101-104. This information may be represented as one or more virtual credentials or "virtual payment cards" in electronic devices 101-104—analogous to physical cards in a wallet—and used by electronic devices 101-104 to conduct transactions. Electronic devices 101-104 may use any number of wireless communication means to perform transactions, including with any/all of stationary merchant terminal 130, mobile merchant terminal 132, and transit gate terminals 140A-C.

In referring to FIG. 1, each of stationary merchant terminal 130 and mobile merchant terminal 132 may be, for example, a Europay, MasterCard, Visa (EMV) terminal associated with one or more merchants, according to some embodiments. In other embodiments, one or more other types of terminal may be used. Transit gate terminals 140A-C may be turnstiles that serve as gatekeepers into, for example, a transit platform area (e.g., platform area for a train or subway). Stationary merchant terminal 130, mobile merchant terminal 132, and transit gate terminals 140A-C may be equipped with hardware to enable wireless communications with electronic devices 101-104 based on, for example, an NFC protocol, according to some embodiments. Further, each of radios 110A-D can be a UWB radio.

FIG. 1 depicts different example scenarios in which one or more of electronic devices 101-104 perform transactions with one or more of stationary merchant terminal 130, mobile merchant terminal 132, and/or transit gate terminals 140A-C. As depicted in the example of FIG. 1, electronic device 101 may be outside the range of stationary merchant terminal 130, mobile merchant terminal 132, and transit gate terminals 140A-C, such that electronic device 101 cannot perform a transaction with any of these terminals. Electronic device 102 may be near stationary merchant terminal 130. Electronic device 104 and mobile merchant terminal 132 may move towards each other to perform a transaction via, for example, an NFC connection. Electronic device 103 may be near transit gate terminal 140B, in which electronic device 103 (and associated user) may seek to enter the transit platform through transit gate terminal 140B. In some embodiments, electronic devices 102-104 may use different virtual payment cards (or other credentials) to perform transactions with their corresponding nearby terminals. For example, electronic devices 102 and 104 may use virtual payment cards associated with different banks to perform transactions with stationary merchant terminal 130 and mobile merchant terminal 132, respectively. And, electronic device 103 may use a virtual prepaid "smart card" that is compatible with transit gate terminals 140B. In other implementations, any credential compatible with a merchant system may be used for a transaction.

In some embodiments, electronic devices 102-104 may automatically select an appropriate credential (e.g., virtual payment card) based on their distance from their respective terminals and their knowledge of the type of terminal. The distance between electronic devices 102-104 and their respective terminals can be determined using radios 110A-D, which can be UWB radios according to some embodiments (radios 110A-D are also referred to herein as "UWB radios 110A-D"). In some embodiments, UWB radios 110A-D may be communicatively connected to location server 120.

Electronic devices 101-104 may engage in a "ranging" operation (or alternatively "secure ranging" operation) with UWB radios 110A-D. In some embodiments, the ranging operation allows UWB radios 110A-D to determine the distance between UWB radios 110A-D and an electronic device, such as any/all of electronic devices 101-104. The ranging operation will be described in greater detail below. In an example, one or more of UWB radios 110A-D can determine their respective distances from electronic device 102 and provide the respective distances to location server 120. Location server 120 can use a triangulation (or trilateration) method to determine a relative location of electronic device 102 within environment 100, according to some embodiments. Location server 120 can communicate the relative location to electronic device 102 via a wireless radio 122. Those skilled in the relevant art(s) will appreciate that wireless radio 122 may be configured to communicate the relative location to electronic device 102 using any wireless protocol, such as any/all of Wi-Fi, Bluetooth, or a cellular communication standard (e.g., UMTS, CDMA, or LTE standards). In some embodiments, wireless radio 122 may utilize "small cell" or "distributed antennae system" deployments to allow location server 120 to communicate with electronic devices 101-104 throughout environment 100. Alternatively, in some embodiments, any or all of UWB radios 110A-D can be used by location server 120 to communicate the relative location to electronic device 102.

If a terminal is stationary (e.g., stationary merchant terminal 130 or any one of transit gate terminals 140A-C), either electronic devices 101-104 or location server 120 may determine the distance between the electronic device and terminal, according to some embodiments. In some embodiments, if a terminal is mobile (e.g., mobile merchant terminal 132), the mobile terminal may perform ranging operations with one or more UWB radios 110A-D to determine the mobile terminal's relative location within environment 100. Location server 120 can send the mobile terminal's location to electronic devices 101-104, according to some embodiments. Any one of electronic devices 101-104 may determine the relative distance between itself and the mobile terminal based on the mobile terminal's location. Alternatively, in some embodiments, location server 120 can determine the relative distance between an electronic device, such as any/all of electronic devices 101-104, and the mobile terminal and send this relative distance information to any/all of electronic devices 101-104.

Once an electronic device determines it is near a terminal, based on ranging operations with one or more of UWB radios 110A-D and communication with location server 120 via wireless radio 122, the electronic device may select the appropriate credential (e.g., virtual payment card) that is compatible with the terminal. If a user of the electronic device wishes to engage in a transaction, the electronic device may be placed near the mobile terminal to initiate a transaction via, for example, NFC. In some embodiments, the electronic device may require an additional authentication measure—such as, for example, a personal identification number (PIN), a biometric reading (input) such as a fingerprint or voice sample, or a facial image—to authorize and/or complete the transaction with the terminal. In some embodiments, the electronic device may not require additional authentication measures, and the transaction may be completed by "hovering" the electronic device near the terminal (e.g., within a sufficiently close distance to perform an NFC connection).

A benefit, among others, of the electronic device selecting an appropriate credential (e.g., virtual payment card) based on location and/or type of terminal is enhanced user experience, such as ease of payment for the user. With the electronic device selecting the appropriate payment mechanism, user interaction to search for the appropriate credential is not required, thus improving user experience. In some instances, automatic selection of the appropriate credential also increases transaction speed, such as in a transportation transaction. Additionally, terminals in environment 100 can be managed by different entities (e.g., different merchants and transit companies). To process transactions with different types of terminals, the disclosed embodiments enable selecting an appropriate credential (e.g., virtual payment card) that is compatible with an adjacent terminal. Accordingly, a terminal can be permitted to process one or more credentials, while other payment types are not supported. Further, the transaction can be independent of terminal type and NFC capability (e.g., NFC-type A, NFC-type B, or NFC-type F).

Figure 2:
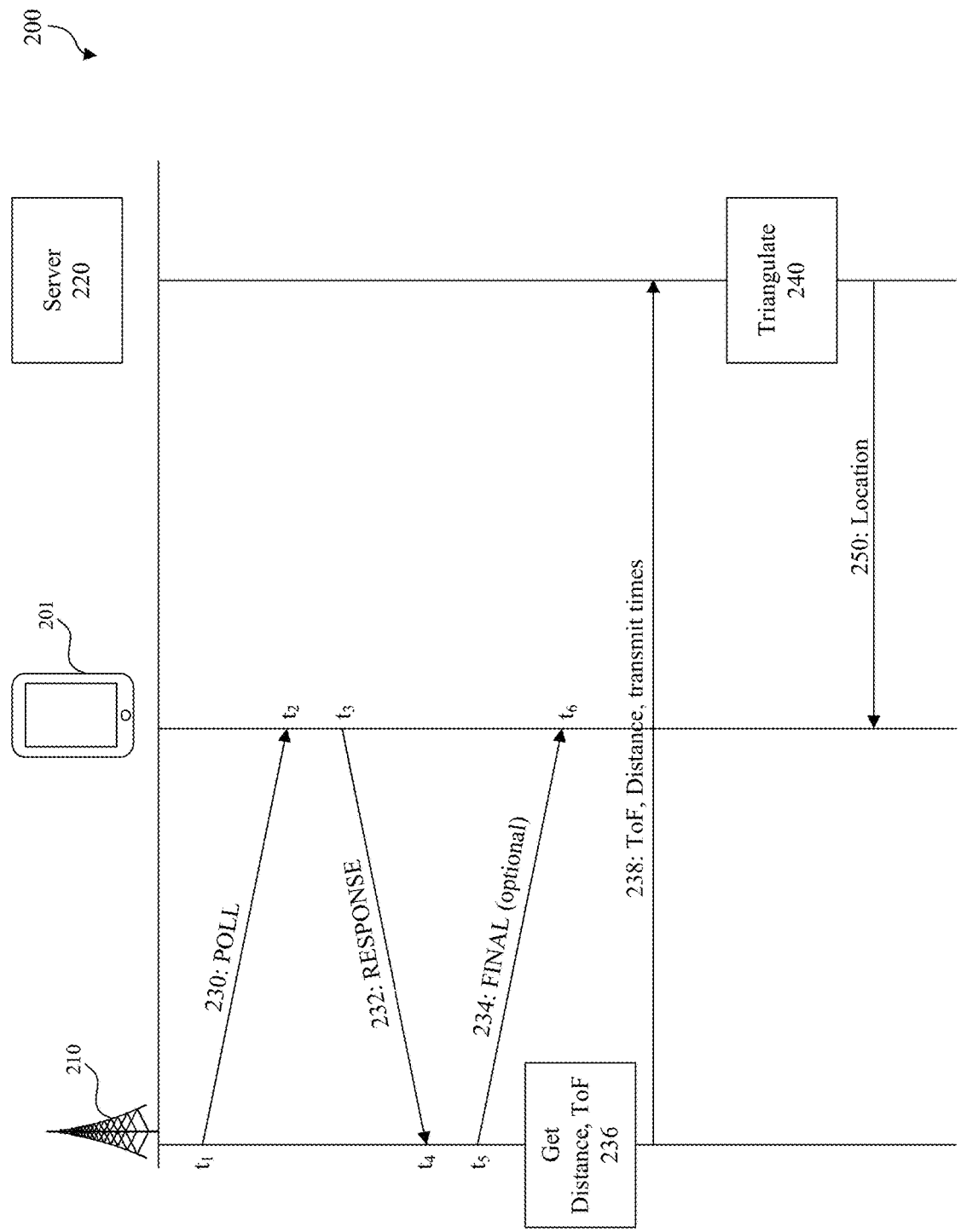
FIG. 2 illustrates an example signaling flow for determining a location of an electronic device, according to some embodiments.

FIG. 2 illustrates an example signaling flow 200 for determining a location of an electronic device, according to some embodiments. In particular, signaling flow 200 depicts a messaging communication between a UWB radio 210, an electronic device 201, and a location server 220, which respectively may be embodiments for UWB radios 110A-D, electronic devices 101-104, and location server 120 of FIG. 1.

In some embodiments, UWB radio 210 may broadcast a POLL message 230 at a time $t_1$. In some embodiments, POLL message 230 may include header information and payload information. The header information may include a packet identifier, an identifier associated with UWB radio 210, and configuration information related to a specific UWB PHY layer option used by UWB radio 210 (e.g., a direct sequence UWB). The payload information may include information such as, for example, a timestamp of the time of transmission. In some embodiments, POLL message 230 elicits a response from another UWB-equipped device (e.g., electronic device 201) so that UWB radio 210 may calculate a distance measurement.

Electronic device 201 may receive POLL message 230 at a time $t_2$. After processing POLL message 230, at a time $t_3$, electronic device 201 may transmit a RESPONSE message 232 to UWB radio 210. In some embodiments, RESPONSE message 232 includes header information and payload information. The header information may include a packet identifier, an identifier associated with UWB radio 210, and an identifier associated with electronic device 201. The payload information may include several parameters such as, for example, a timestamp of the time $t_2$ for the receipt of POLL message 230 and a timestamp of the time $t_3$ for the transmission of RESPONSE message 232.

UWB radio 210 may receive RESPONSE message 232 at a time $t_4$ and may send a FINAL message 234 at a time $t_5$. In some embodiments, FINAL message 234 is optional and includes header information and payload information. The header information may include a packet identifier, an identifier associated with UWB radio 210, and an identifier associated with electronic device 201. The payload information may include several parameters such as, for example, a timestamp of the time $t_4$ for the receipt of RESPONSE message 232 and a timestamp of the time $t_5$ for the transmission of FINAL message 234. Electronic device 201 receives FINAL message 234 at a time $t_6$.

In some embodiments, electronic device 201 may exchange messages—such as messages 230-234—with multiple UWB radios in an overlapping manner. Depending on a desired accuracy of location information, UWB radio 210 may send POLL message 230 repeatedly in the order of, for example, milliseconds.

UWB radio 210 may determine a distance based on the time of flight (ToF) of messages 230-234. ToF may be determined before, after, or in parallel with transmitting FINAL message 234. In some embodiments, the following equations can be used to calculate the ToF and thus determine the distance between electronic device 201 and UWB radio 210:

$$\text{Time of Flight}(ToF) = t_4 - t_3 = t_2 - t_1 = \frac{(t_4 - t_1) - (t_3 - t_2)}{2}$$

$$\text{Distance} = \text{Speed of Light} * \text{Time of Flight} = 3.0 * 10^0 * ToF$$

In some embodiments, the ToF and distance may be calculated by UWB radio 210 after receipt of FINAL message 234 and sent to location server 220. In some embodiments, timestamps of the times $t_1$, $t_2$, $t_3$, and $t_4$ may be sent to location server 220, in which case location server 220 may calculate both the ToF and the distance. Alternatively, in some embodiments, the ToF may be calculated by UWB radio 210 and distance may be calculated by location server 220.

In referring to FIG. 2, after UWB radio 210 calculates the ToF and the distance, UWB radio 210 may send any/all of the ToF information, distance, and time-related information to location server 220 in a message 238. In some embodiments, location server 220 may also receive similar distance measurements from one or more other UWB radios that perform some or all of the ranging messaging exemplified by messages 230-234 with electronic device 201. In some embodiments, with three or more distance measurements received by one or more UWB radios, location server 220 may perform a triangulation (or trilateration) technique 240 to determine the location of electronic device 201 relative to the one or more UWB radios and the environment associated with the UWB radios (e.g., environment 100 of FIG. 1).

Location server 220 may send location data 250 to electronic device 201. This location data 250 may have different formats, which will be described below. Signaling flow 200 may be performed periodically (e.g., in the order of hundreds of milliseconds) to allow electronic device 201 to know its location within an environment (e.g., environment 100).

Figure 3:
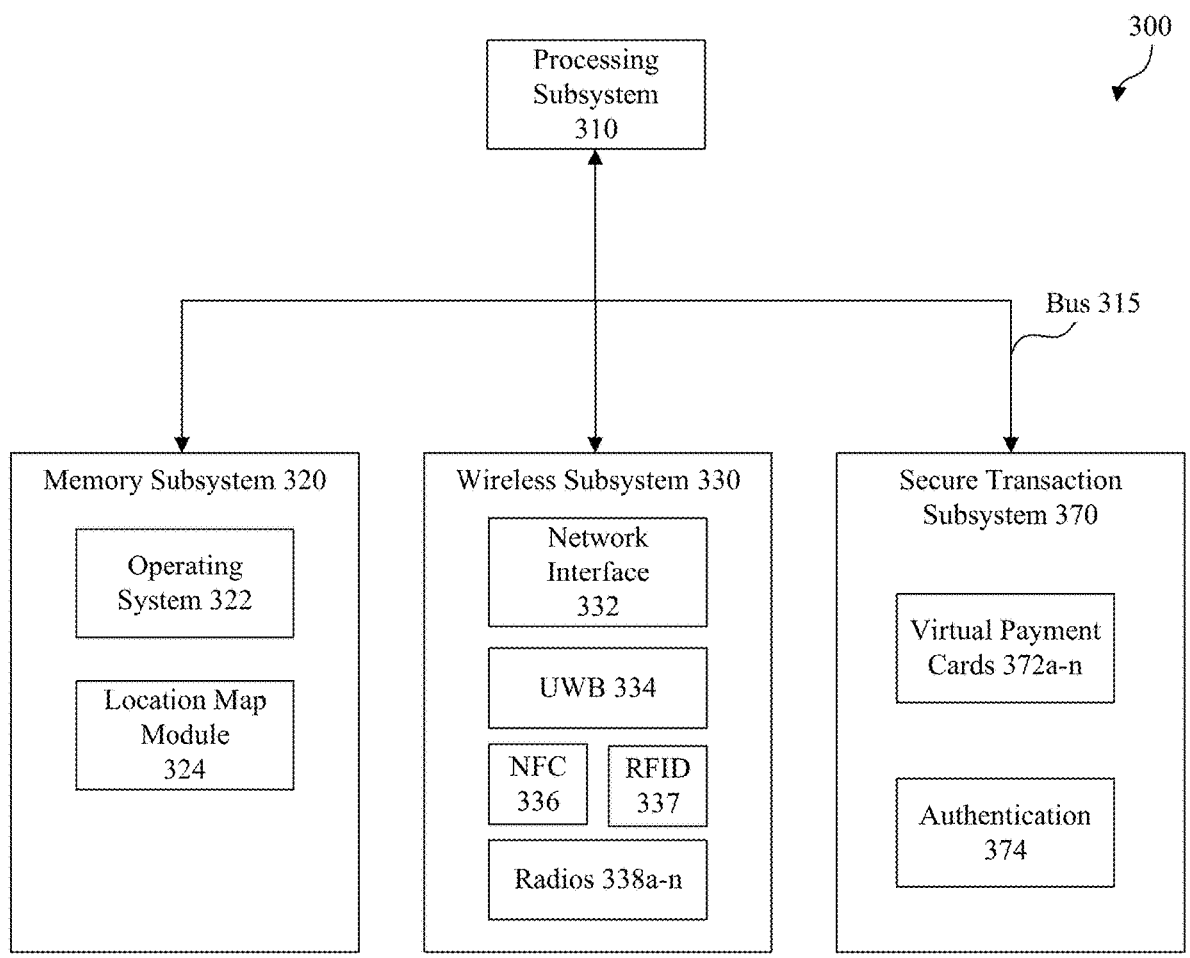
FIG. 3 illustrates an example electronic device, according to some embodiments.

FIG. 3 illustrates a block diagram of an example electronic device 300, according to some embodiments. Electronic device 300 may be an embodiment of electronic devices 101-104 of FIG. 1 or electronic device 201 of FIG. 2. The elements of electronic device 300 depicted in FIG. 3 are not limiting and are intended to illustrate an example configuration appropriate to achieve the systems and methods of some embodiments of the present disclosure.

Electronic device 300 may be implemented as a stand-alone or a discrete device, or may be incorporated within or coupled to another electronic device or host device such as a mobile phone, a smartwatch, portable computing device, a wearable device, a camera, or a Global Positioning System (GPS) unit or another computing device such as a personal digital assistant, a video gaming device, a laptop, a tablet, or any other suitable electronic device that will be apparent to those skilled in the relevant art(s) without departing from the spirit and scope of the present disclosure.

Electronic device 300 may include a processing subsystem 310, a memory subsystem 320, a wireless subsystem 330, and a secure transaction subsystem 370. Processing subsystem 310, memory subsystem 320, wireless subsystem 330, and secure transaction subsystem 370 are communicatively connected by a bus 315. Bus 315 may be an electrical, optical, or electro-optical connection that the subsystems can use to communicate commands and data among one another. Electronic device 300 may have more than one electrical, optical, or electro-optical connection among the subsystems without departing from the spirit and scope of the present disclosure.

Processing subsystem 310 may include one or more devices that perform computational operations. For example, processing subsystem 310 can include one or more microprocessors, application-specific integrated circuits (ASICs), microcontrollers, and/or programmable-logic devices. Processing subsystem 310 may execute an operating system 322 (stored in memory subsystem 320) that includes procedures (or a set of instructions) for handling various system services to perform, for example, hardware-dependent tasks.

Processing subsystem 310 may also execute a location map module 324 (stored in memory subsystem 320) that includes procedures (or a set of instructions) for handling mapping services described in this disclosure. Location map module 324 may, via processing subsystem 310 and wireless subsystem 330, communicate with a location server (e.g., location server 120 of FIG. 1 or location server 220 of FIG. 2) to allow electronic device 300 to determine its location within an environment (e.g., environment 100 of FIG. 1). Location data, such as location data 250 of FIG. 2, may be received by location map module 324 via processing subsystem 310 and wireless subsystem 330. Based on the location data, location map module 324 may determine if electronic device 300 is within a certain distance from a terminal (e.g., stationary merchant terminal 130, mobile merchant terminal 132, or transit gate terminals 140A-C of FIG. 1). Location map module 324 may interact with wireless subsystem 330 and secure transaction subsystem 370 to enable a transaction with a nearby terminal by selecting an appropriate credential (e.g., virtual payment card) based on the information stored in memory subsystem 320 as well as location data received from the location server.

Location map module 324 may store different information. In some embodiments, location map module 324 may include a "virtual map" of the environment (e.g., environment 100 of FIG. 1), including one or more locations and protocol requirements for terminals (e.g., stationary merchant terminal 130, mobile merchant terminal 132, and transit gate terminals 140A-C of FIG. 1) within the environment. The location data may be received from a location server (e.g., location server 120 of FIG. 1 or location server 220 of FIG. 2) and may be in the form of a coordinate within the virtual map. The electronic device may determine its relative distance from a terminal based on the coordinate information and the location of the terminal. In some embodiments, location map module 324 may receive location information of both electronic device 300 and terminals in the environment. In some embodiments, the location data received from the location server may be an indication that electronic device 300 is near a particular terminal.

Memory subsystem 320 may include one or more devices for storing data and/or instructions for processing subsystem 310 and wireless subsystem 330. For example, memory subsystem 320 can include dynamic random access memory (DRAM), static random access memory (SRAM), and/or other types of memory. More generally, memory subsystem 320 may include volatile memory and/or non-volatile memory configured to store information. In addition, memory subsystem 320 can include mechanisms for controlling access to the memory. In some embodiments, memory subsystem 320 includes a memory hierarchy that includes one or more caches coupled to a memory in electronic device 300. Additionally or alternatively, one or more of the caches may be located in processing subsystem 310.

Wireless subsystem 330 may include processors, controllers, radios/antennas, sockets/plugs, and/or other devices for engaging in wireless communication with another wireless communication device—e.g., communicating packets or frames with another device via a wireless communication link. In some embodiments, wireless subsystem 330 may include a network interface 332, an ultra-wideband (UWB) radio 334, a radio-frequency identification (RFID) radio 337, a near field communications (NFC) radio 336, and radios 338*a*-*n* (e.g., Wi-Fi, Bluetooth, 60 GHz communications, cellular communications radios, and/or combinations thereof). Network interface 332 receives signals from UWB radio 334, NFC radio 336, RFID radio 337, and/or wireless radios 338*a*-*n* and processes these signals for use by other subsystems of electronic device 300. The signals received by radios 338*a*-*n* may be, for example, a Wi-Fi signal from a nearby Wi-Fi access point or a cellular telecommunications signal using, for example, any one of UMTS, LTE, or WiMAX protocols. Wireless subsystem 330 enables electronic device 300 to, for example: (i) send and receive UWB signals via UWB radio 334, (ii) detect contactless interactions with terminals via NFC radio 336 and RFID radio 337, and (iii) communicate with other wireless communication devices via a wireless communication protocol such as, for example, Wi-Fi, Bluetooth, and/or a cellular communication protocol.

Secure transaction subsystem 370 includes processors and memory that may be separate from processing subsystem 310 and memory subsystem 320. Secure transaction subsystem 370 may be a tamper-resistant environment in electronic device 300 to provide secure transactions involving one or more credentials (e.g., virtual payment cards) stored in electronic device 300. In some embodiments, secure transaction subsystem 370 stores one or more virtual payment cards or other credentials. Further, secure transaction subsystem 370 can store associated account information for one or more credentials (e.g., virtual payment cards). In particular, in some embodiments, secure transaction subsystem 370 may include virtual payment cards 372a-n that serve as virtual representations of different payment card types, including payment cards of two or more different types. Virtual payment cards 372a-n may mimic the protocol requirements of various contactless credential types such as, for example, (i) EMV cards, (ii) "Felicity Card" (FeliCa) cards, (iii) closed loop transit cards based on, for example, "Mifare Plus," "Mifare DESFire," "Calypso," or MoC, (iv) MoT standards ("Ministry of Construction" and "Ministry of Transport" of China), and (v) other payment card implementations.

Smart cards that mimic the function of transit station cards may also be represented by one or more of virtual payment cards 372a-n, according to some embodiments. Different metropolitan cards may operate on different proprietary systems based on, for example, NFC or RFID technology. These different metropolitan cards may include Bay Area Rapid Transit (BART) "Clipper" cards (California, USA), "SmarTrip" (District of Columbia, USA), "the Chicago Card" (Illinois, USA), "SmartLink" (New York, USA), "Suica"/"Pasmo"/"Setamaru" (Tokyo, Japan), "SPTC" (Shanghai, China), "Navigo" (Paris, France), "Oyster" (London, England), and so on. These cards and management of associated account information (e.g., registration information, account balance, etc.) may be implemented in respective applets stored in memory and executed on processors operating within secure transaction subsystem 370.

Secure transaction subsystem 370 also includes an authentication element 374. Authentication element 374 may store instructions and identifier information for performing authentication functions for one or more virtual payment cards 372a-n, as well as for other credentials, etc. The identifier information may include any/all of biometric information (such as a fingerprint or a voice sample), alphanumeric passcodes (such as a PIN number), a facial image, and/or various other measures that may be required to use one or more virtual payment cards 372a-n. When a particular credential is used and a transaction is attempted, authentication element 374 may be executed to gather the required identification information from, for example, a user of electronic device 300.

During a transaction, secure transaction subsystem 370 may interact with any/all of wireless subsystem 330, processing subsystem 310, and memory subsystem 320. For example, when electronic device 300 approaches a terminal, processing subsystem 310, which executes location map module 324, may send a signal to secure transaction subsystem 370 to indicate that electronic device 300 is approaching a terminal of some type. Secure transaction subsystem 370 may select an appropriate virtual payment card from virtual payment cards 372a-n. If a payment is initiated by, for example, "hovering" electronic device 300 near the terminal or otherwise introducing electronic device 300 into a field of the terminal, secure transaction subsystem 370 executes instructions to perform a transaction using the appropriate virtual payment card. The payment initiation may be detected by NFC radio 336 or RFID radio 337 of wireless subsystem 330, which sends a signal to secure transaction subsystem 370 to indicate that a transaction is being attempted. In some embodiments, authentication element 374 of secure transaction subsystem 370 executes authentication instructions. Further, in some implementations, secure transaction subsystem 370 can debit an account associated with the selected virtual payment card, according to some embodiments.

In some embodiments, secure transaction subsystem 370 may store multiple "Express Cards," in which an appropriate Express Card can be automatically presented to the terminal and processed without user authentication, e.g., for fast throughput in, for example, high-volume metro stations. An Express Card may be used in a "fast passage" application such as, for example, the fast passage transportation terminal application described below with respect to FIG. 6. A benefit, among others, of the automatic presentation of the Express Card to the terminal is that an appropriate Express Card—e.g., an Express Card that is compatible with the terminal's contactless technology (e.g., NFC-type A, NFC-type B, or NFC-type F)—can be selected and processed by the electronic device without manual user authentication, thus improving user experience when traveling through fast passage transportation terminals.

In some embodiments, electronic device 300 may include one or more additional processing subsystems 310, memory subsystems 320, wireless subsystems 330, and/or secure transaction subsystems 370. Additionally, it may be possible for one or more of these subsystems to be omitted from electronic device 300. Moreover, electronic device 300 may include one or more additional subsystems that are not shown in FIG. 3. For example, electronic device 300 can include, but is not limited to: a display subsystem for displaying information, a data collection subsystem, an audio and/or video subsystem, an alarm subsystem, a media processing subsystem, and/or an input/output (I/O) subsystem. Also, although separate subsystems are shown in FIG. 3, some or all of the above-described subsystems can be integrated into one or more of the other subsystems in electronic device 300 without departing from the spirit and scope of the present disclosure.

Figure 4:
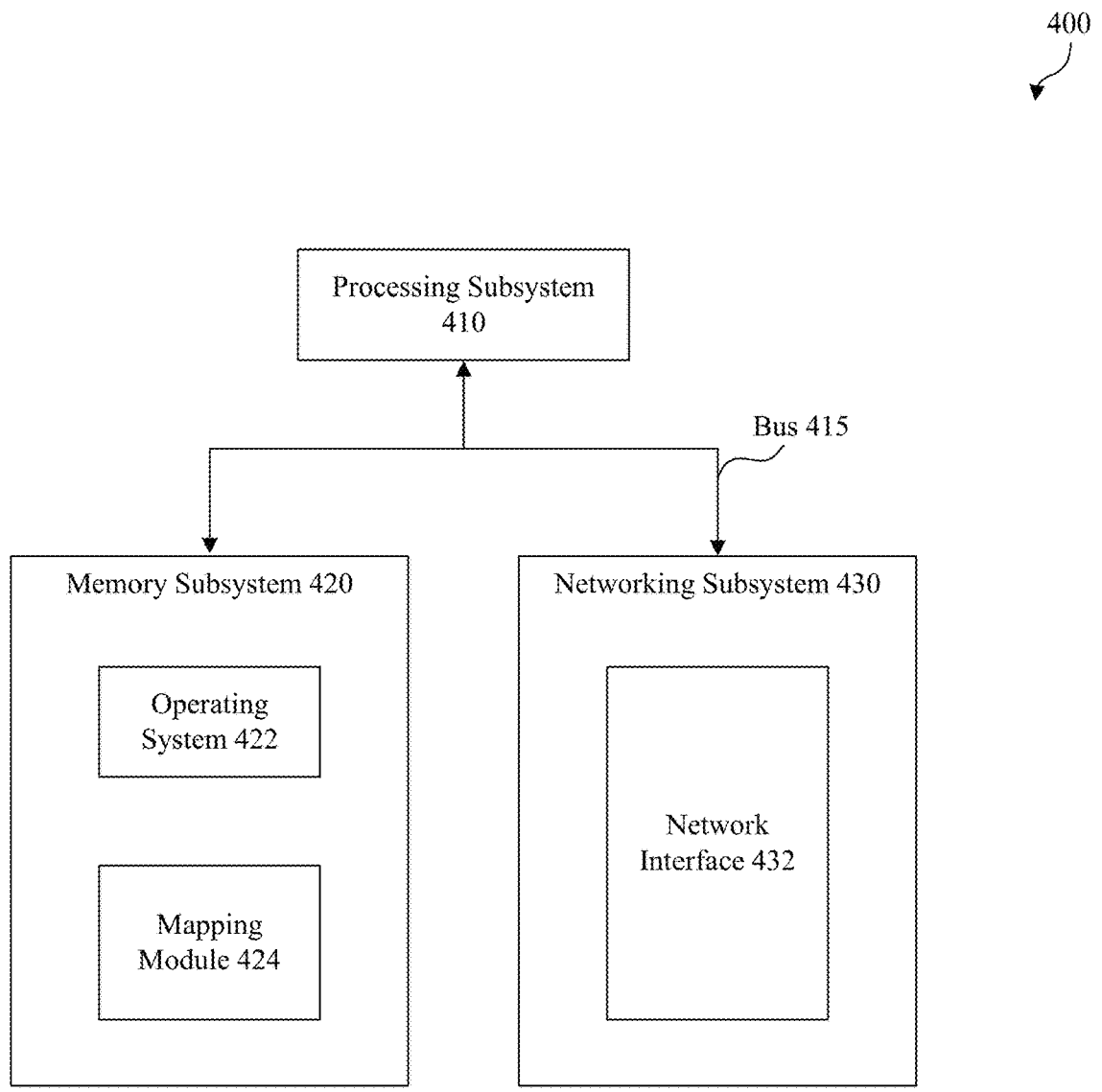
FIG. 4 illustrates an example location server for determining a location of an electronic device, according to some embodiments.

FIG. 4 illustrates a diagram of an example location server 400, according to some embodiments. Location server 400 may be an embodiment of location server 120 of FIG. 1 or location server 220 of FIG. 2. The elements of location server 400 depicted in FIG. 4 are not limiting and are intended to illustrate an example configuration appropriate to achieve the system and methods of the present disclosure.

Location server 400 may include a processing subsystem 410, a memory subsystem 420, and a networking subsystem 430. Subsystems 410, 420, and 430 are communicatively connected by a bus 415, which may be an electrical, optical, or electro-optical connection that the subsystems can use to communicate commands and data among one another. Although location server 400 is shown with a single bus 415, a different number or configuration of electrical, optical, or electro-optical connections among the subsystems is possible without departing from the spirit and scope of the present disclosure.

Processing subsystem 410 may include one or more devices that perform computational operations. For example, processing subsystem 410 can include one or more microprocessors, application-specific integrated circuits (ASICs), microcontrollers, and/or programmable-logic devices. Processing subsystem 410 may execute operating system 422 (stored in memory subsystem 420) that includes procedures (or a set of instructions) for handling various system services for performing, for example, hardware-dependent tasks.

Processing subsystem 410 may also execute a mapping module 424 (in memory subsystem 420) that includes procedures (or a set of instructions) for handling the mapping services described in this disclosure. Mapping module 424 may, via processing subsystem 410 and networking subsystem 430, communicate with UWB radios (e.g., UWB radios 110A-D of FIG. 1 or UWB radio 210 of FIG. 2) and an electronic device (e.g., electronic devices 101-104 of FIG. 1 or electronic device 201 of FIG. 2) to allow location server 400 to determine the location of the electronic device within an environment (e.g., environment 100 of FIG. 1). Location data, such as location data 250 in FIG. 2, may be generated by mapping module 424 via processing subsystem 410 by receiving time of flight measurements for the electronic device from the UWB radios and performing one or more triangulation (or trilateration) techniques to determine the relative location of the electronic device within the environment. Location server 400 may send the location data to the electronic device via networking subsystem 430. In some embodiments, location data generated by mapping module 424 may include an indication that the electronic device is near a terminal (e.g., stationary merchant terminal 130, mobile merchant terminal 132, or transit gate terminals 140A-C of FIG. 1), and this indication may be used by the electronic device to select an appropriate credential (e.g., a virtual payment card) to perform a transaction. In some embodiments, the location information from mapping module 424 may be updated in response to the terminal moving to another location (e.g. mobile merchant terminal 132 of FIG. 1 moving to another location). Location server 400 may process the updated location information and determine the location of the electronic device relative to the new location of the terminal. Alternatively, location server 400 can send the updated location information to the electronic device, which in turn determines its relative location to the new location of the terminal using, for example, a mapping service on the electronic device.

Networking subsystem 430 may include processors, controllers, radios/antennas, sockets/plugs, and/or other devices used for engaging in wireless communication with another wireless communication device—e.g., communicating packets or frames with another device via a wireless communication link. In some embodiments, a network interface 432 within networking subsystem 430 receives signals and translates the signals into digital data and signals recognizable by other elements of location server 400. The signals received by network interface 432 may be from wired and/or wireless radios communicatively coupled to location server 400. In some embodiments, a wireless radio (e.g., wireless radio 122 of FIG. 1 or wireless radio 622 of FIG. 6) may be connected by a wired connection to location server 400. In some embodiments, UWB radios (e.g., UWB radios 110A-D of FIG. 1 or UWB radios 610A-C of FIG. 6) may be connected to location server 400 via wired connections. Signals received from UWB radios may also be received and translated by network interface 432.

The signals received from the UWB radios may include ToF measurements representative of relative distance measurements between the UWB radios and the electronic device. The ToF measurements are processed by mapping module 424 within memory subsystem 420 and processing subsystem 410 to determine location data associated with the electronic device. Network interface 432 can send the location data to the electronic device via a wireless radio communicatively coupled to location server 400 (e.g., wireless radio 122 of FIG. 1 or wireless radio 622 of FIG. 6).

Figure 5:
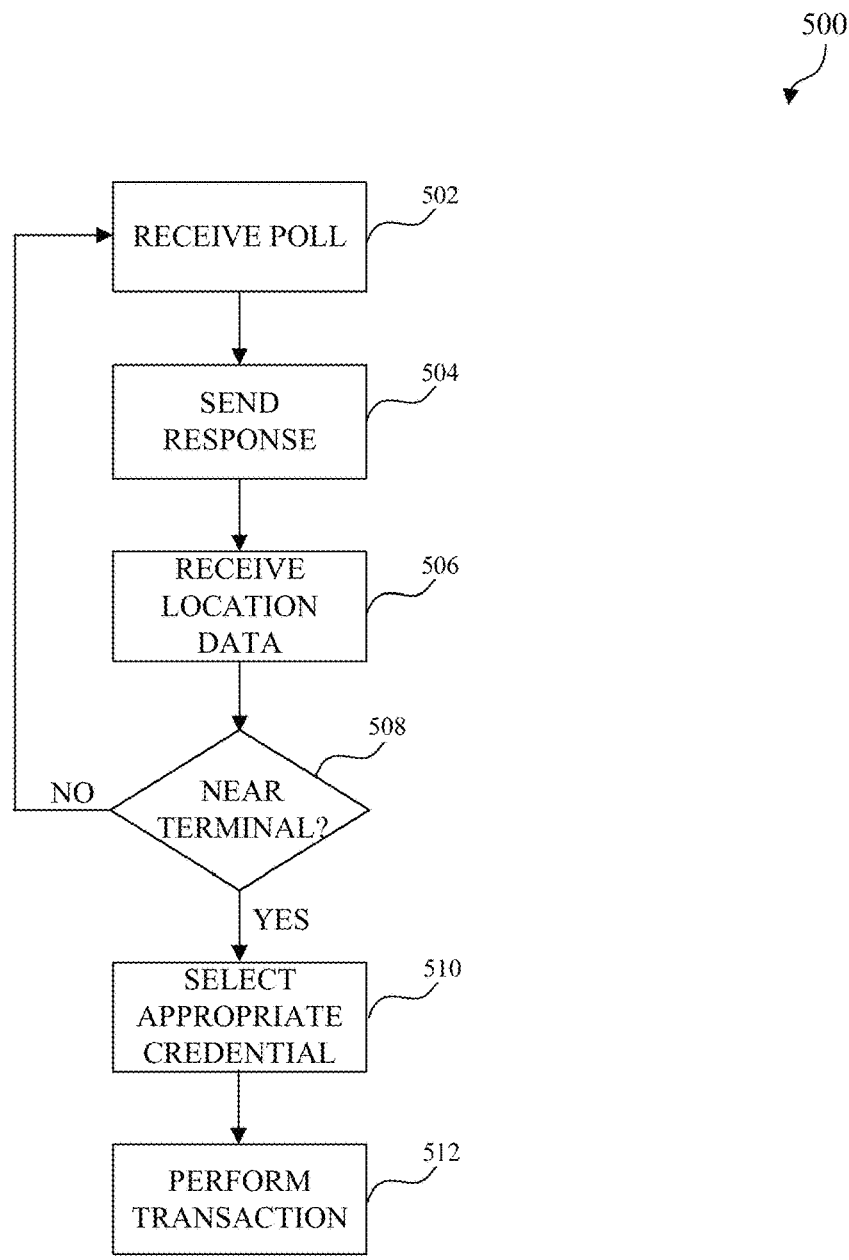
FIG. 5 illustrates an example flowchart for selecting an appropriate credential, according to some embodiments.

FIG. 5 illustrates an example flowchart 500 of operations for an electronic device to select an appropriate credential, according to some embodiments. The operations depicted in flowchart 500 may be performed by an electronic device, such as any/all of electronic devices 101-104 of FIG. 1, electronic device 201 of FIG. 2, or electronic device 300 of FIG. 3. It is to be appreciated that not all operations may be needed to perform the disclosure provided herein and that one or more additional operations may be performed. Further, some of the operations may be performed concurrently, or in a different order than shown in FIG. 5.

Flowchart 500 begins at 502, where the electronic device receives a "POLL" message from a UWB radio. The POLL message may be an embodiment of POLL message 230 of FIG. 2.

At 504, the electronic device responds to the UWB radio with a "RESPONSE" message, which may be an embodiment of RESPONSE message 232 of FIG. 2. A "FINAL" message, which may be an embodiment of FINAL message 234 of FIG. 2, may be received by the electronic device from the UWB radio.

Using the information gathered from the message exchange in operations 502 and 504, the UWB radio may determine one or more time of flight (ToF) measurements to be used to estimate the location of the electronic device within an environment (e.g., environment 100 of FIG. 1). The UWB radio may send the ToF measurements to a location server (e.g., location server 120 of FIG. 1, location server 220 of FIG. 2, or location server 400 of FIG. 4) so the location server may determine the location of the electronic device via, for example, a triangulation (or trilateration) method.

At 506, the electronic device may receive location data from the location server. The location data may be an embodiment of location data 250 of FIG. 2. The location data may have several formats as described elsewhere herein.

At 508, the electronic device may determine if it is near a terminal (e.g., stationary merchant terminal 130, mobile merchant terminal 132, or transit gate terminals 140A-C of FIG. 1). In some embodiments, the location data received from the location server (at 508) may be a coordinate that provides a relative location of the electronic device within the environment. The electronic device's location map module, such as location map module 324 of FIG. 3, may have the locations of terminals within the environment stored in memory. Based on the received location data and the stored locations of the terminals, the electronic device may determine if it is within a distance less than a predetermined distance (or threshold) from one of the terminals. In some embodiments, the electronic device may receive locations of the terminals from the location server and determine if it is within a distance less than a predetermined distance from one of the terminals. In some embodiments, the location data received from the location server may include an indication that the electronic device is within a predetermined distance from the terminal. If the electronic device does not determine it is near a terminal at 510, the electronic device may continue to listen for POLL messages at 502.

At 510, if the electronic device determines that it is near a terminal, the electronic device may determine a credential (e.g., a virtual payment card) to select for a transaction. The credential data may be stored within a secure transaction subsystem on the electronic device such as, for example, secure transaction subsystem 370 of FIG. 3. In some embodiments, the location map module within the electronic device (e.g., location map module 324 of FIG. 3) may have information on terminal types and/or terminal locations. In some embodiments, the location map module can select an appropriate virtual payment card based on the terminal type and/or terminal location. In some embodiments, the location server may send an indication that the electronic device is near a terminal and also can be configured to indicate the type of terminal. In some implementations, the location map module may select or indicate the credential (e.g., virtual payment card) based on the indication received from the location server.

With the credential selected, the electronic device may wait to establish communication with the terminal prior to processing the transaction. The electronic device may establish communication with the terminal via an NFC radio or an RFID radio (e.g., NFC radio 336 or RFID radio 337 of FIG. 3), according to some embodiments. For example, an NFC radio has a nominal range of 4 centimeters and the communication can be established within this range.

At 512, after communication has been established, a transaction between the electronic device—using the selected credential—and the terminal is performed. In some embodiments, a transit gate terminal transaction may be performed between the electronic device and the terminal. A credential (e.g., virtual payment card) associated with a transit gate terminal may store a remaining balance that can be used to process the transaction, according to some embodiments.

In some embodiments, the electronic device may interact with an EMV terminal in a way that requires communication with a payment network associated with a financial institution. Prior to an interaction with the EMV terminal, a confirmation operation may be performed prior to performing a transaction, according to some embodiments. For example, the electronic device may provide a prompt (e.g., to a user of the electronic device) to enter confirmation such as, for example, a PIN number, a biometric indicator (e.g., a fingerprint or a voice sample), or a facial image. The confirmation may be employed depending on the type of terminal interacting with the electronic device. For example, the electronic device may require confirmation for a purchase of goods or services. In some embodiments, the EMV terminal may communicate with a server within the payment network to conduct the transaction. The EMV terminal sends a transaction data block to the electronic device and receives a "signed" transaction data block indicating that the electronic device authorizes the transaction, according to some embodiments. This signed transaction data block can be sent to the payment network, where an account associated with the electronic device may be debited for the amount specified by the signed transaction data block.

In some embodiments, a "wallet" application may be displayed on the electronic device (e.g., to a user of the electronic device) when performing the transaction. The wallet application can display a list of eligible virtual payment cards or other credentials for use with the nearby terminal. In some instances, the list of virtual payment cards can be limited to those eligible for use with the terminal. Based on the list of virtual payment cards, the electronic device can receive input specifying the virtual payment card to use for the transaction—e.g., a default virtual payment card can be selected by input authorizing the transaction, such as touch input on a fingerprint identity sensor, or another virtual payment card can be selected by input(s) indicating the card. In some embodiments, for a fast passage application, a list of eligible virtual payment cards can be presented. If a selection is not received within a predetermined distance from the fast passage transportation terminal (e.g., 30 cm away from the terminal), a default Express Card can be automatically selected by the electronic device for the transaction. Further, in some embodiments, a length of time in which eligible virtual payment cards are presented can vary. For example, if a user of the electronic device is in a hurry (e.g., as determined by the speed the device approaches the nearby terminal), the electronic device can present the list of eligible virtual payment cards when the device is farther away from the terminal (e.g., meters or centimeters away from the terminal) as compared to if the device is moving more slowly, in which the electronic device can present the list of eligible virtual payment cards when the device is closer to the terminal.

Figure 6:
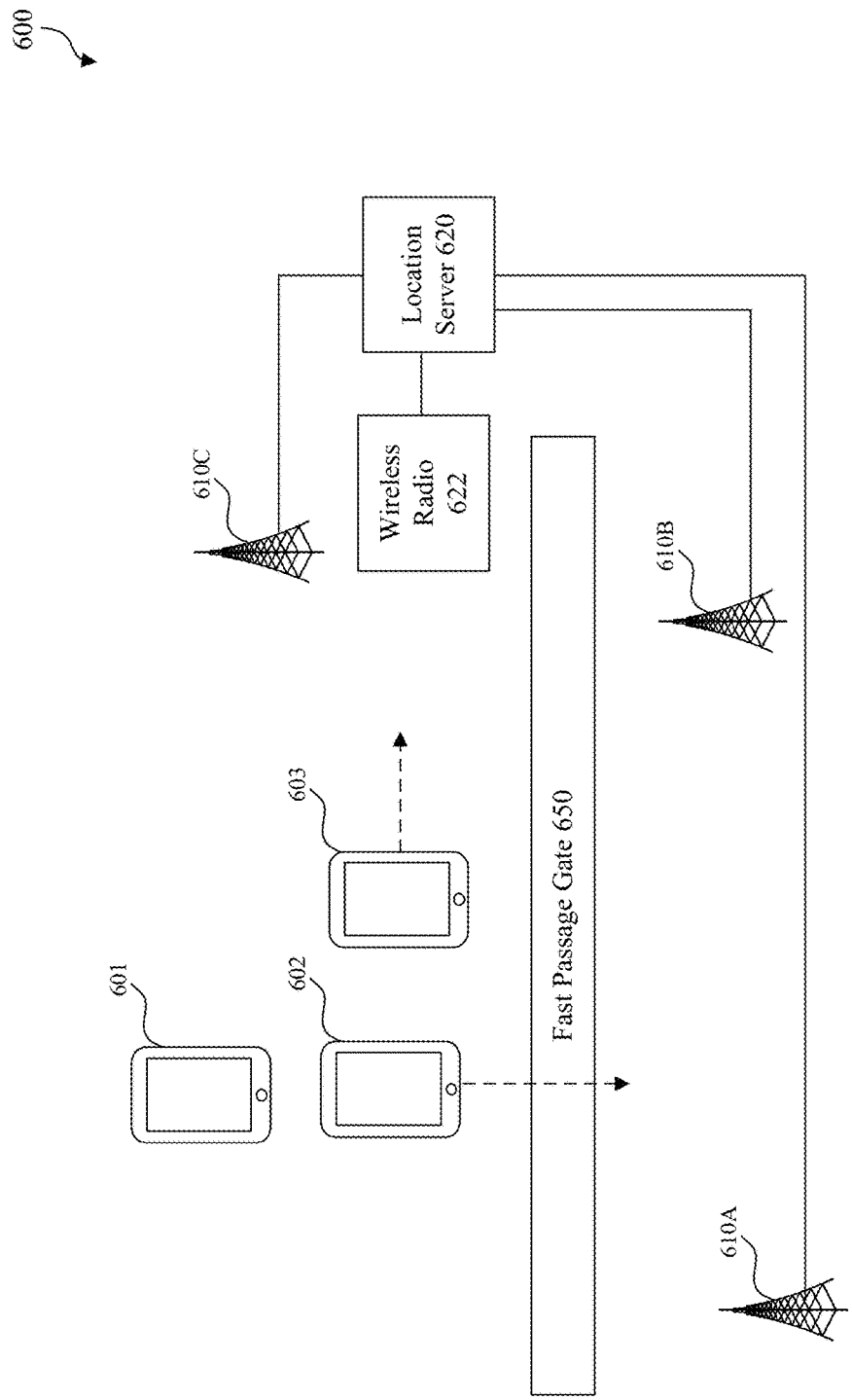
FIG. 6 illustrates an example environment for a "fast track" transportation terminal application, according to some embodiments.

FIG. 6 illustrates an example environment 600 for a "fast passage" transportation terminal application, according to some embodiments. In some embodiments, rather than a transit gate terminal providing physical entry onto a transit platform, such as any one of transit gate terminals 140A-C of FIG. 1, a fast passage gate 650 may be employed to allow quick passage—without the use of a physical barrier (e.g., a turnstile)—onto the transit platform.

Environment 600 may include electronic devices 601-603, UWB radios 610A-C connected to location server 620, a wireless radio 622 communicatively connected to a location server 620, and a fast passage gate 650. By way of example, location server 620 may be an embodiment of location server 220 of FIG. 2 or location server 400 of FIG. 4; UWB radios 610A-C may be embodiments of UWB radios 110A-D of FIG. 1 or UWB radio 210 of FIG. 2; and/or electronic devices 601-603 may be embodiments of electronic devices 101-104 of FIG. 1, electronic device 201 of FIG. 2, or electronic device 300 of FIG. 3.

Within environment 600, any/all of electronic devices 601-603 may communicate with any/all of UWB radios 610A-C so that UWB radios 610A-C may determine or otherwise facilitate time of flight (ToF) measurements. In some embodiments, the message exchange between one of the UWB radios 610A-C and one of the electronic devices 601-603 may be similar to that of messages 230-234 depicted in FIG. 2.

Location server 620 may receive ToF measurements from, for example, UWB radios 610A-C and determine the location data of any/all of electronic devices 601-603. Location server 620 may communicate the location data to any/all of electronic devices 601-603 via a wireless radio 622. Wireless radio 622 may be configured to communicate using any wireless communication protocol, including any/all of a Wi-Fi standard, a Bluetooth standard, a cellular communication standard (e.g., UMTS, CDMA, or LTE), or a proprietary scheme. Wireless radio 622 may utilize "small cell" or "distributed antennae system" deployments to allow location server 620 to communicate with any one of electronic devices 601-603. Based on the location data, when an electronic device approaches fast passage gate 650, the electronic device may select a credential (e.g., virtual payment card) compatible with the protocol used by fast passage gate 650.

Fast passage gate 650 may be placed between a general area of environment 600 and a transit platform of environment 600. Fast passage gate 650 may communicate with any or all of electronic devices 601-603 via RFID, NFC, or a short- or medium-distance wireless protocol such as, for example, Bluetooth. When a wireless connection is made between fast passage gate 650 and one of the electronic devices 601-603, the electronic device may send communications to perform a transaction. For example, the transaction can debit the credential (e.g., virtual payment card) or an associated account selected by the electronic device, or otherwise validate access through fast passage gate 650.

In some embodiments, measures may be taken to ensure that an electronic device does not falsify location information such that location server 620 cannot accurately determine the location of the electronic device. In the fast passage transportation terminal application, a user of the electronic device may attempt to alter the content of the RESPONSE message (e.g., RESPONSE message 232) with a UWB radio, thus allowing the user of the electronic device to enter into the transit platform area of environment 600 without payment or permission.

To prevent such deceptive and/or fraudulent activity, secure ranging may be used to prevent manipulation of the RESPONSE message, according to some embodiments. A secure transaction subsystem within the electronic device (e.g., secure transaction subsystem 370 of FIG. 3) may include a hard-coded secure key used to encrypt messages sent to a UWB radio. In some embodiments, the hard-coded secure key cannot be imitated, altered, or mimicked by, for example, the electronic device. The UWB radio may be made aware of the secure key (or a list of possible secure keys) via a database accessible by location server 620 or the UWB radio. The UWB radio may decrypt a message received from electronic devices within environment 600. In some embodiments, secure ranging can be combined with video imaging techniques to detect fraudulent activity. For example, a non-paying device's location (as determined by secure ranging) can be mapped to a video image of the non-paying device (and associated user) crossing fast passage gate 650, thus providing visual identity.

Figure 7:
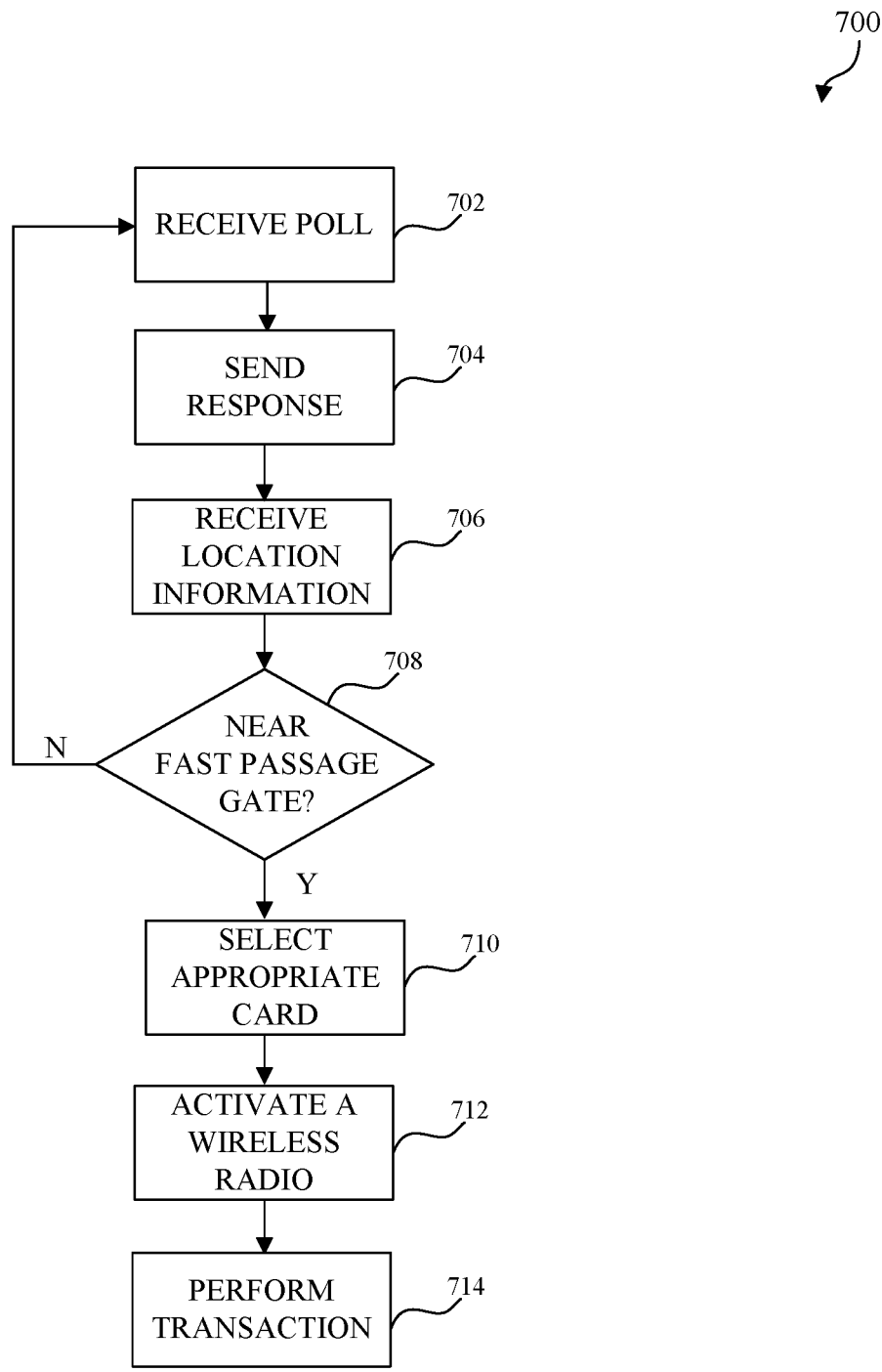
FIG. 7 illustrates an example flowchart for selecting an appropriate credential in a "fast track" transportation application, according to some embodiments.

FIG. 7 illustrates an example flowchart 700 of operations for an electronic device to select an appropriate credential in a fast passage gate application, according to some embodiments. The operations depicted in flowchart 700 may be performed by an electronic device such as any/all of electronic devices 101-104 of FIG. 1, electronic device 201 of FIG. 2, or electronic device 300 of FIG. 3. It is to be appreciated that not all operations may be needed to perform the disclosure provided herein. In some implementations, additional or alternate operations may be performed. Further, some of the operations may be performed concurrently, or in a different order than shown in FIG. 7.

At 702, the electronic device receives a "POLL" message from a UWB radio. The POLL message may be an embodiment of POLL message 230 of FIG. 2.

At 704, the electronic device responds to the UWB radio with a "RESPONSE" message, which may be an embodiment of RESPONSE message 232 of FIG. 2. A "FINAL" message, which may be an embodiment of FINAL message 234 of FIG. 2, may also be received by the electronic device from the UWB radio.

Using the information gathered from the message exchange in operations 702 and 704, the UWB radio may determine time of flight (ToF) measurements to be used to determine or estimate the location of the electronic device within an environment (e.g., environment 600 of FIG. 6), such as by using triangulation or trilateration. In some embodiments, the POLL, RESPONSE, and FINAL messages may be encrypted based at least in part on an encryption key stored in a secure subsystem of the electronic device and known to the UWB radio. The UWB radio may send the ToF measurement to a location server (e.g., location server 120 of FIG. 1, location server 220 of FIG. 2, or location server 400 of FIG. 4) so that the location server may determine the location of the electronic device via, for example, triangulation (or trilateration).

At 706, the electronic device may receive location data from the location server. The location data may be an embodiment of location data 250 of FIG. 2. The location data may have any format, including formats described above with respect to FIG. 2.

At 708, the electronic device may determine if it is near a fast passage gate, such as fast passage gate 650 of FIG. 6. In some embodiments, the location data received from the location server (at 706) may be a coordinate that provides a relative location of the electronic device within the environment. The electronic device's location map module, such as location map module 324 of FIG. 3, may have one or more locations of the fast passage gate within the environment stored in memory. Based on the stored locations of the fast passage gate, the electronic device may determine if it is within a distance less than a predetermined distance from the fast passage gate. In some embodiments, the location data received from the location server may indicate that the electronic device is within a predetermined distance/range from the fast passage gate. If the electronic device does not determine it is not within the predetermined distance/range of the fast passage gate, the electronic device may continue to listen for POLL messages at 702.

At 710, if the electronic device determines it is near the fast passage gate, the electronic device may determine a credential to select for a transaction. The credential (e.g., virtual payment card) data may be stored within a secure transaction subsystem on the electronic device such as, for example, secure transaction subsystem 370 of FIG. 3. In some embodiments, the location map module within the electronic device (e.g., location map module 324 of FIG. 3) may have information on the card type or types that are compatible with the fast passage gate and select a credential based at least in part on that information. In some embodiments, the location server may send an indication that the electronic device is near the fast passage gate, in which case the indication can also include the credential type(s) that corresponds to the fast passage gate.

At 712, the electronic device may activate a wireless radio. In some embodiments, the electronic device may not be able to communicate with the fast passage gate via an NFC radio due to a longer distance between the electronic device and the fast passage gate compared to the distance supported by the NFC radio (e.g., about 4 centimeters). In some embodiments, the electronic device may activate a Bluetooth radio, a WiFi radio, an RFID radio, or other such short- or medium-range radio (e.g., radios 338*a*-*n* of FIG. 3) to perform the communication for a transaction between the electronic device and the fast passage gate. In some embodiments, the electronic device selects the credential (e.g., virtual payment card) before crossing the fast passage gate. In some other embodiments, the electronic device may wait until crossing the fast passage gate into the transit platform area before selecting the credential (e.g., virtual payment card).

At 714, upon reaching or crossing the fast passage gate, a transaction between the electronic device—using the selected credential (e.g., virtual payment card)—and the fast passage gate is performed. In some embodiments, crossing a virtual line representative of the fast passage gate initiates the transaction, in which, for example, the credential is debited or payment/access validation is otherwise performed. The electronic device can detect crossing the virtual line by determining that its location has changed from a location associated with a general or waiting area of the environment to a location within the transit platform area of the environment, according to some embodiments. In some embodiments, the transaction may be performed via a Bluetooth connection, a WiFi connection, or other short- or medium-range radio connection between the electronic device and the fast passage gate. The operations of this transaction may be similar to those described above with respect to 512 of flowchart 500 in FIG. 5. In some embodiments, the credential (e.g., virtual payment card) used for the transaction may be a card compatible with a transportation system and may store a remaining balance (e.g., an actual cash value) that can be used to process the transaction.

Figure 8:
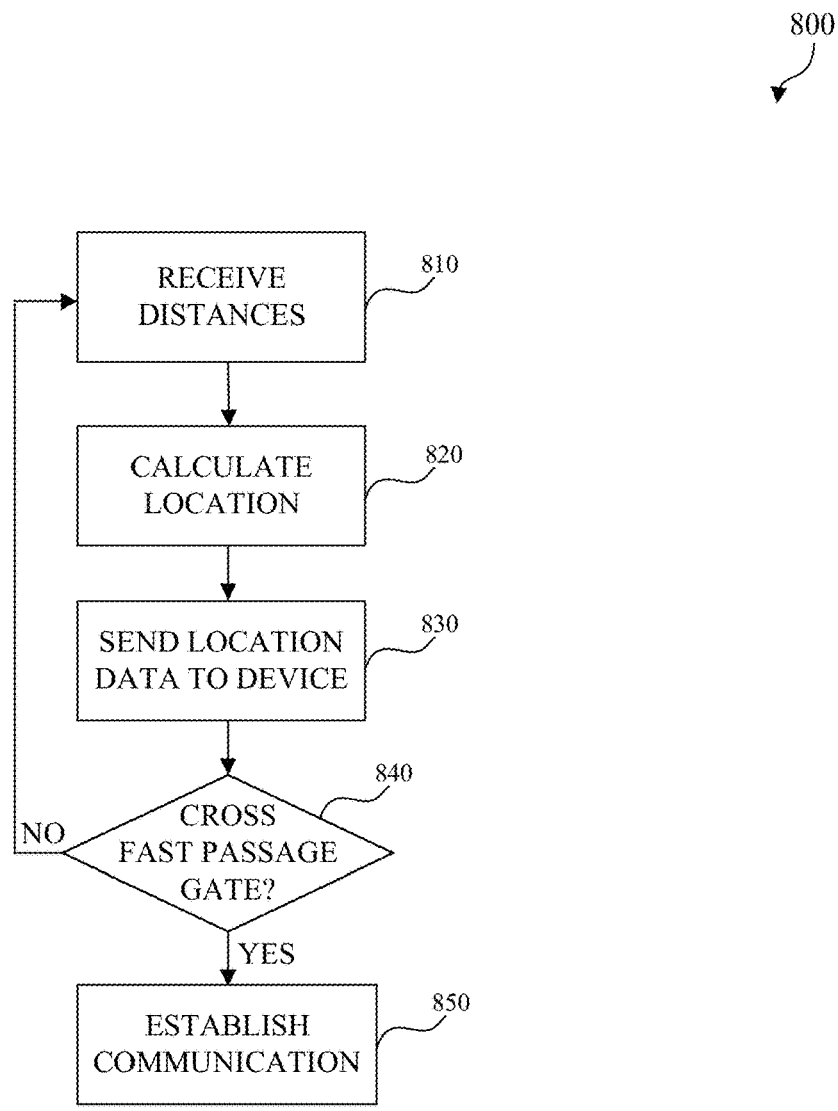
FIG. 8 illustrates an example flowchart for determining a location of an electronic device for a wireless transaction, according to some embodiments.

FIG. 8 illustrates an example flowchart 800 of operations for a location server to determine a location of an electronic device for a wireless transaction, according to some embodiments. The operations depicted in flowchart 800 may be performed by a location server, such as one or more of location server 120 of FIG. 1, location server 220 of FIG. 2, or location server 400 of FIG. 4. It is to be appreciated that not all operations may be needed to perform the disclosure provided herein. In some implementations, additional or alternate operations may be performed. Further, some of the operations may be performed concurrently, or in a different order than shown in FIG. 8.

In some embodiments, the location server may perform operations to determine the location of the electronic device using one or more ToF measurements received from one or more UWB radios. The location server may send location data to the electronic device to allow the electronic device to select an appropriate credential (e.g., virtual payment card). In some embodiments, the location server may also perform a wireless transaction with the electronic device when the electronic device crosses a virtual line representative of a fast passage gate such as, for example, fast passage gate 650 of FIG. 6.

At 810, the location server receives one or more distance measurements (or other position references) from one or more UWB radios relating to an electronic device. The one or more distance measurements may be an embodiment of message 238 of FIG. 2. In some embodiments, the one or more distance measurements received from the UWB radios may be based on ToF measurements made by the one or more UWB radios. In some embodiments, the location server may receive the one or more ToF measurements and calculate the distance based on the received ToF measurements.

At 820, based on the distance measurement data, the location server can determine location data of the electronic device within an environment via, for example, triangulation (or trilateration).

At 830, the location server sends the location data to the electronic device. As described above, the location data may be sent via a wireless radio communicatively coupled to the location server. In some implementations, the wireless radio may be an embodiment of wireless radio 122 of FIG. 1 or wireless radio 622 of FIG. 6. The wireless radio may operate on any number of wireless communication protocols, such as any/all of a Wi-Fi protocol, a Bluetooth protocol, a cellular communication standards (e.g., UMTS, CDMA, or LTE standards), and/or a proprietary scheme. In some embodiments, the wireless radio may utilize "small cell" or "distributed antennae system" deployments.

In some embodiments, the location data may have different formats. In some embodiments, the location data may be in the form of a coordinate within a virtual map stored on the electronic device. In some embodiments, the location data may include location information of both the electronic device and any terminals in the environment (e.g., stationary merchant terminal 130 of FIG. 1, mobile merchant terminal 132 of FIG. 1, transit gate terminals 140A-C of FIG. 1, or fast passage gate 650 of FIG. 6). In some embodiments, the location data may be an indication that the electronic device is within a predetermined distance from a terminal.

At 840, the location server may determine whether the electronic device crosses the fast passage gate or other such threshold associated with passage through the fast passage gate. As described above, in some embodiments, a virtual line may be representative of the fast passage gate, in which the virtual line delineates between a general area of the environment and a transit platform area of the environment—e.g., outside and inside of the fast passage gate, respectively. If the location server determines that the electronic device does not cross the virtual line, the electronic device returns to operation 810 and receives distance measurements from UWB radios.

At 850, if the location server determines that the electronic device crosses the virtual line or other such demarcation point (e.g., for charging a fee), the location server may contact the electronic device via the wireless radio. The electronic device may then initiate the transaction as described above with respect to 714 of FIG. 7. In some embodiments, the electronic device may initiate the transaction with the location server.

Figure 9:
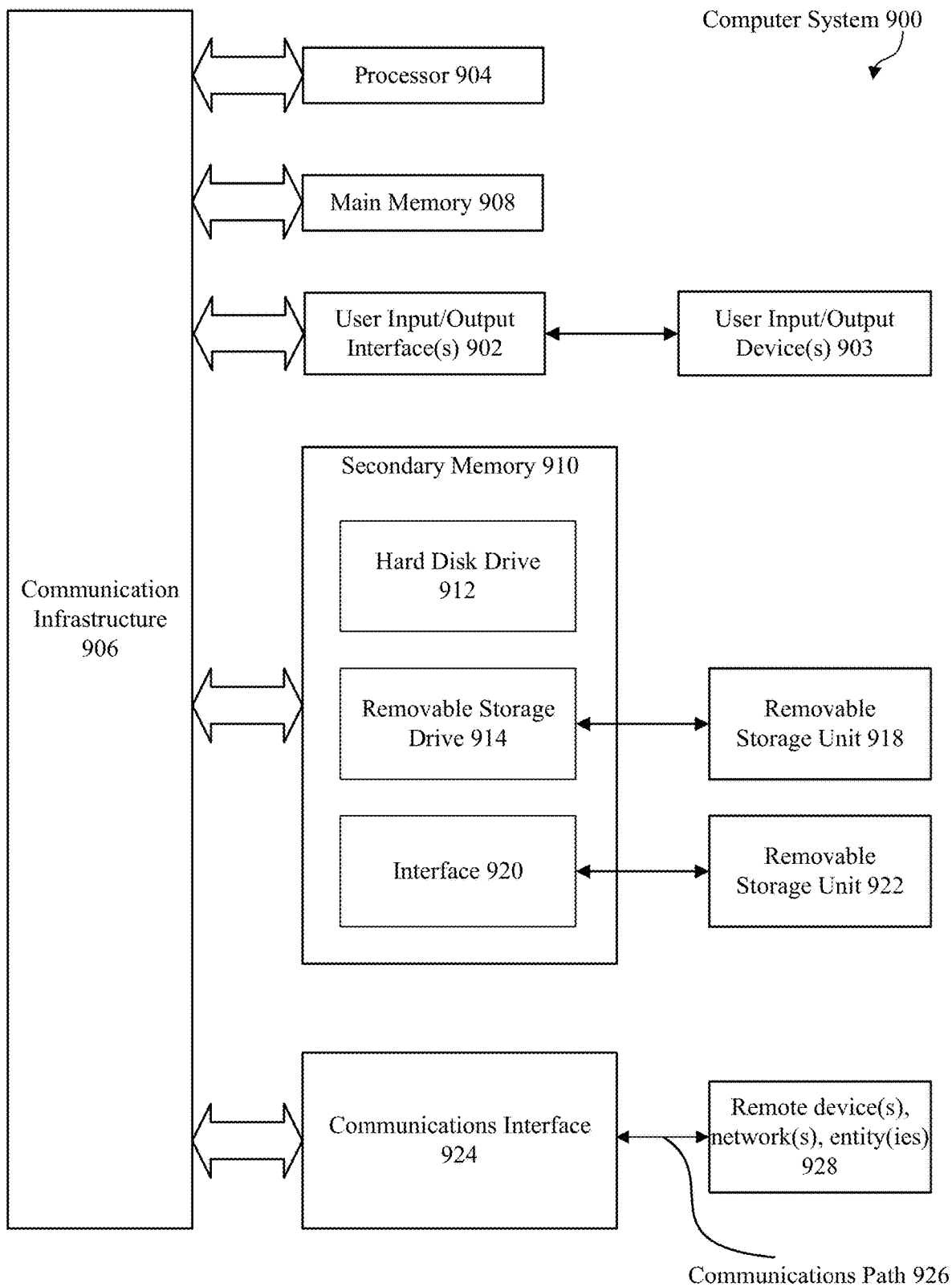
FIG. 9 illustrates a functional block diagram of an example computer system, according to some embodiments.

Various embodiments can be implemented, for example, using one or more computer systems, such as computer system 900 shown in FIG. 9. Computer system 900 can be any well-known computer capable of performing the functions described herein. For example, and without limitation, computer system 900 can be capable selecting an appropriate credential (e.g., virtual payment card) based on (i) a relative location of an electronic device to a terminal and (i) the type of terminal. For example, one or more computer systems 900 can be capable of performing operations related to some or all of the electronic devices (e.g., electronic devices 101-104 of FIG. 1, electronic device 201 of FIG. 2, and electronic device 300 of FIG. 3), the terminals (e.g., stationary merchant terminal 130 of FIG. 1, mobile merchant terminal 132 of FIG. 1, transit gate terminals 140A-C of FIG. 1, and fast passage gate 650 of FIG. 6), and the location servers (e.g., location server 120 of FIG. 1, location server 220 of FIG. 2, or location server 400 of FIG. 4) described above with respect to FIGS. 1-8.

Computer system 900 includes one or more processors (also called central processing units, or CPUs), such as a processor 904. Processor 904 is connected to a communication infrastructure or bus 906. Computer system 900 also includes input/output device(s) 903, such as monitors, keyboards, pointing devices, etc., that communicate with communication infrastructure or bus 906 through input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some embodiments, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding embodiments can be implemented in a wide variety of configurations and architectures. Therefore, some or all of the operations in the preceding embodiments may be performed in hardware, in software or both. In some embodiments, a tangible apparatus or article of manufacture comprising a tangible computer usable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, embodiments of the disclosure as contemplated, and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described embodiments, but should be defined only in accordance with the following claims and their equivalents.

What is claimed is:

1. An electronic device comprising:
a memory configured to store a map module that includes a location of a terminal, wherein the terminal comprises a fast passage gate, wherein the map module indicates one or more eligible credentials of a plurality of credentials, wherein the one or more eligible credentials are compatible with the fast passage gate;
a wireless radio;
a secure transaction subsystem configured to store the plurality of credentials; and
a processor communicatively coupled to the memory, the secure transaction subsystem, and the wireless radio, wherein the processor is configured to:
receive, via the wireless radio, a poll message;
in response to receiving the poll message, send, via the wireless radio, a response message;
subsequent to sending the response message, receive, via the wireless radio, location information;
based at least in part on the location information, determine that a distance between the electronic device and the terminal is less than a predetermined distance, wherein the predetermined distance varies based on a rate at which the electronic device approaches the terminal;
in response to determining the distance between the electronic device and the terminal is less than the predetermined distance, present the one or more eligible credentials of the plurality of credentials, wherein a length of time for presenting the one or more eligible credentials varies based on the rate at which the electronic device approaches the terminal;
select a credential from the one or more eligible credentials; and
initiate a transaction with the terminal using the selected credential.

2. The electronic device of claim 1, wherein the wireless radio comprises an ultra-wideband (UWB) radio.

3. The electronic device of claim 1, wherein the processor is further configured to:
   establish a communication between the electronic device and the terminal at a distance greater than 4 cm via a short-range wireless radio on the electronic device; and
   in response to establishing the communication, initiate the transaction with the terminal via the short-range wireless radio.

4. The electronic device of claim 3, wherein the processor is further configured to receive authentication information indicating that the transaction is authorized.

5. The electronic device of claim 4, wherein the authentication information comprises a personal identification number (PIN), a fingerprint, a facial image, or a voice sample.

6. The electronic device of claim 3, wherein the short-range wireless radio comprises a Bluetooth radio.

7. The electronic device of claim 1, wherein the location information is based at least in part on a time of flight of the poll and response messages.

8. A non-transitory computer-readable medium storing instructions that, when executed by a processor of an electronic device, cause the processor to perform operations, the operations comprising:
   storing a map module that includes a location of a terminal, wherein the terminal comprises a fast passage gate, and wherein the map module indicates one or more eligible credentials compatible with the fast passage gate;
   receiving, via a wireless radio, location information;
   based at least in part on the location information, determining that a distance between the electronic device and the terminal is less than a first predetermined distance, wherein the first predetermined distance varies based on a rate at which the electronic device approaches the terminal;
   in response to determining the distance between the electronic device and the terminal is less than the first predetermined distance, presenting the one or more eligible credentials, wherein a length of time for presenting the one or more eligible credentials varies based on the rate at which the electronic device approaches the terminal;
   selecting a credential from the one or more eligible credentials after presenting the one or more eligible credentials; and
   initiating a transaction with the terminal using the selected credential.

9. The non-transitory computer-readable medium of claim 8, wherein the operations further comprise:
   receiving, via the wireless radio, a poll message;
   in response to receiving the poll message, sending, via the wireless radio, a response message, wherein the location information is based at least in part on the poll and response messages.

10. The non-transitory computer-readable medium of claim 8, wherein the operations further comprise:
    establishing a communication between the electronic device and the terminal via a short-range wireless radio on the electronic device; and
    in response to establishing the communication, initiating the transaction with the terminal via the short-range wireless radio.

11. A method for selecting a credential from a plurality of credentials stored on an electronic device, the method comprising:
    storing a map module that includes a location of a terminal, wherein the terminal comprises a fast passage gate, and wherein the map module indicates one or more eligible credentials of the plurality of credentials, wherein the one or more eligible credentials are compatible with the fast passage gate;
    receiving, via a wireless radio, a poll message;
    in response to receiving the poll message, sending, via the wireless radio, a response message;
    receiving, via the wireless radio, location information, wherein the location information is based at least in part on the poll and response messages;
    based at least in part on the location information, determining that a distance between the electronic device and the terminal is less than a predetermined distance, wherein the predetermined distance varies based on a rate at which the electronic device approaches the terminal;
    in response to determining the distance between the electronic device and the terminal is less than the predetermined distance, present the one or more eligible credentials from the plurality of credentials, wherein a length of time for presenting the one or more eligible credentials varies based on the rate at which the electronic device approaches the terminal;
    selecting a credential from the one or more eligible credentials;
    establishing a communication between the electronic device and the terminal via a short-range wireless radio on the electronic device; and
    in response to establishing the communication, initiating a transaction with the terminal via the short-range wireless radio using the selected credential.

12. The method of claim 11, wherein the wireless radio comprises an ultra-wideband (UWB) radio configured to decrypt the response message, wherein the response message is encrypted with a hard-coded secure key.

13. The non-transitory computer-readable medium of claim 8, wherein the selecting the credential operation comprises:
    determining that a selection from the one or more eligible credentials is not received within a second predetermined distance from the terminal that is less the first predetermined distance from the terminal; and
    selecting a default credential from the one or more eligible credentials.

14. The electronic device of claim 1, wherein the fast passage gate comprises a virtual line or demarcation point between a general area and a transit platform.

15. The electronic device of claim 1, wherein to initiate the transaction, the processor is configured to:
    initiate, via the wireless radio, the transaction after the electronic device crosses the fast passage gate.

16. The electronic device of claim 1, wherein to present the one or more credentials, the processor is configured to display the one or more credentials on a display of the electronic device.

17. The electronic device of claim 1, wherein to initiate the transaction, the processor is further configured to:
    initiate, via the wireless radio, the transaction before the electronic device crosses the fast passage gate.

18. The method of claim 11, further comprising: receiving authentication information indicating that the transaction is authorized.

19. The method of claim 18, wherein the authentication information comprises: a personal identification number (PIN), a fingerprint, a facial image, or a voice sample.

20. The non-transitory computer-readable medium of claim 8, wherein the operations further comprise: receiving authentication information indicating that the transaction is authorized, wherein the authentication information comprises: a personal identification number (PIN), a fingerprint, a facial image, or a voice sample.

* * * * *